United States Patent [19]
Overby, Jr. et al.

[11] Patent Number: 6,016,503
[45] Date of Patent: Jan. 18, 2000

[54] METHODS, SYSTEMS AND COMPUTER PROGRAM PRODUCTS FOR PREEMPTIVE AVOIDANCE OF CONSTRAINTS FOR SHARED RESOURCES

[75] Inventors: Linwood Hugh Overby, Jr., Raleigh; Balachandar Rajaraman, Cary, both of N.C.

[73] Assignee: International Business Machines Corporation, Armonk, N.Y.

[21] Appl. No.: 08/920,975

[22] Filed: Aug. 29, 1997

[51] Int. Cl.[7] ........................................ G06F 9/00
[52] U.S. Cl. ............................ 709/104; 709/1; 709/105; 705/8; 706/21; 710/6; 710/17; 710/18; 370/229; 370/235
[58] Field of Search ........................... 395/674, 651, 395/653, 683, 729, 732, 849, 861; 370/235, 229; 709/5, 303, 104, 105; 713/1, 100; 710/241, 244, 29, 41, 6, 17, 18; 706/8

[56] References Cited

U.S. PATENT DOCUMENTS

| | | | |
|---|---|---|---|
| 3,505,508 | 4/1970 | Leyde | 364/528.26 |
| 4,816,987 | 3/1989 | Brooks et al. | 364/165 |
| 5,218,456 | 6/1993 | Stegbauer et al. | 358/404 |
| 5,475,844 | 12/1995 | Shiramizu et al. | 395/674 |
| 5,673,253 | 9/1997 | Shaffer | 370/229 |
| 5,793,748 | 8/1998 | Murase | 370/235 |

*Primary Examiner*—Meng-Ai T. An
*Assistant Examiner*—Nabil El-Hady
*Attorney, Agent, or Firm*—Myers Bigel Sibley & Sajovec; Jerry W. Herndon

[57] ABSTRACT

Methods, systems (apparatus) and computer program products are provided which control access to a shared resource in a data processing system by predicting utilization of the shared resource based upon historical utilization of the shared resource. Users of the shared resource are then notified of a potential shortage of the shared resource if the prediction predicts that the shared resource will be overutilized. The prediction may utilize a linear extrapolation to predict future utilization of the share resource. Furthermore, the interval between predictions of the future utilization may be based on time, number of utilization events or a combination of the two.

30 Claims, 3 Drawing Sheets

METHODS, SYSTEMS AND COMPUTER PROGRAM PRODUCTS FOR PREEMPTIVE AVOIDANCE OF CONSTRAINTS FOR SHARED RESOURCES

FIELD OF THE INVENTION

The present invention relates to data processing systems and more particularly to data processing systems having common resources shared by multiple users.

BACKGROUND OF THE INVENTION

Data processing systems which allow for multiple concurrent processes have been known for years. For example, multi-user systems employing mainframe computers with remote terminals include IBM VM and MVS systems. These systems allow for multiple processes on a single computer system. As a result, the hardware and/or software resources of the data processing system may be shared across multiple users or multiple processes. Examples of shared resources in a data processing system include main storage, data buffer pools in main storage, processors, disk/Direct Access Storage Devices (DASD), cache, and network communication adapters.

Utilization of a shared resource may be illustrated by use of a protocol stack in a data processing system. A protocol stack is a layered protocol in a data processing system which may be used by an application running on a data processing system in order to communicate with other applications or users across a communication network. In a communication protocol stack, application data may reside in user or a shared storage area for multiple applications on the data processing system. The application data may be copied to a protocol buffer which also may use main storage of the data processing system. Headers/trailers may be added to the data by various layers of the protocol stack and this information is stored in buffers in main storage. The data may also be processed by the stack for compression/encryption/segmentation and this information also stored in buffers. In addition all of the information necessary for the operation of the protocol stack is also resident in main storage buffers. The data may also be queued for transmission out of the data processor through a network interface.

As is seen in the communications protocol stack example, multiple aspects of the stack may utilize shared memory resources. Thus, throughout the utilization of the protocol stack, shared resources are consumed and made available as the protocol stack performs its operations. Furthermore, more than one instance of the stack may be present on a data processing system such that multiple stacks compete for the available resources. As a protocol stack or protocol stacks perform their operations, the utilization of the shared resource may increase and decrease depending on the data passing through the stack, the operations performed at a specific time by the stack, and the number of concurrent operations. This variable and unpredictable utilization of shared resources may result in over-utilization of the resource such that when a stack seeks to store information in a buffer, no buffer is available.

One previous mechanism to avoid buffer over-utilization was to establish a fixed buffer utilization threshold. If the utilization of the resource exceeded this threshold only high priority requests could obtain buffers. The users of the buffers could not cooperatively work with the storage manager to alleviate the buffer shortage condition. Even with a cooperative mechanism using fixed thresholds, when the buffer utilization exceeded the threshold, a flag was set by the storage manager which could be used by the users of the buffers to reduce the utilization of the buffers. However, a fixed threshold may result in under-utilization of the buffers if the threshold is set too low or may still result in over-utilization or failures if the threshold is set too high. Furthermore, the use of the buffers may be "bursty" in that the data is not provided at a constant rate. If the peak of a burst of data exceeds the threshold, then the over-utilization flag may be set. This may cause a reduction in the use of the buffers when, in fact, more buffers could be utilized. Additionally, if the threshold is exceeded early in the burst of data, then the users of a shared resource may not be informed quickly enough to avoid the over-utilization.

In light of the above discussion, a need exists for improvements in the control of shared resources in computer systems. More particularly, a need exists for controlling the use of shared buffers in memory of data processing systems.

SUMMARY OF THE INVENTION

In view of the above discussion, it is an object of the present invention to provide for improved performance of shared resources by increasing the utilization of the shared resources without resulting in over-utilization of the shared resource.

A further object of the present invention is to provide for more dynamic and responsive control over shared resources while reducing inefficiencies introduced by these control mechanisms.

These and other objects of the present invention are provided by methods, systems (apparatus) and computer program products which control access to a shared resource in a data processing system by predicting utilization of the shared resource based upon historical utilization of the shared resource. Users of the shared resource are then notified of a potential shortage of the shared resource if the prediction predicts that the shared resource will be over-utilized. The prediction may utilize a linear extrapolation to predict future utilization of the share resource. Alternatively, a filtered extrapolation may also be utilized to predict future utilization of the shared resource.

By controlling shared resources based on a prediction of future resource utilization the present invention may avoid both the inefficiencies of fixed threshold mechanisms and the performance disadvantages of the uncontrolled use of shared resources. Because the present invention utilizes historical information to dynamically establish when to notify of a potential over-utilization, the present invention may accommodate the dynamic nature of shared resource usage without the need for user intervention to alter threshold levels.

In one embodiment of the present invention, the prediction of future utilization is accomplished by determining the change in utilization of the shared resource over a predefined number of events. A current utilization value for the shared resource is also determined. The future utilization is then determined based upon the change in utilization and the current utilization.

The future utilization of the shared resource may be determined by adding to the current utilization value the change in utilization of the shared resource so as to predict the utilization of the shared resource after a subsequent predefined number of events. Alternatively, the future utilization may be determined by dividing the change in utilization by the number of events to provide an incremental change value. The incremental change value may then be multiplied by the number of events into the future of the future utilization to provide a future differential value. The future differential value and the current utilization may then be summed to provide the future utilization. Thus, durations having variable numbers of events may be utilized.

The predefined number of events corresponds to a predefined number of utilization events, such as allocations, frees, expansions and contractions of the shared resource. The responsiveness of the present invention to changes in utilization of the shared resource may be increased if the prediction of utilization is based on use of the shared resource rather than an arbitrary time interval. Thus, for example, as frequency of use of the resource increases, if the prediction interval is based on utilization events, the time between predictions will decrease as the frequency of utilization events increases. This also allows for less resources devoted to predictions when little activity is occurring and more resources devoted to predictions during the relatively more critical period of higher utilization. This also allows for increased predictions during periods where over-utilization is most likely to occur, i.e. frequent utilization event periods.

Alternatively, the predefined number of events may correspond to a predefined period of time. In such a case the prediction of utilization may occur at regular time intervals.

According to the present invention, the users of a shared resource may be notified of a shortage of the shared resource if the prediction of the utilization of the shared resource is greater than a predefined maximum utilization of the shared resource. Such notification may be accomplished by setting a constraint flag to indicate that the shared resource is predicted to be over-utilized. The constraint flag may be maintained as set until the occurrence of at least one of the slope of the utilization of the shared resource becoming negative or the predicted utilization of the shared resource predicting that the shared resource will no longer be over-utilized.

Furthermore, a critical flag may be set when the maximum utilization of the shared resource is reached. The critical flag would be reset when the utilization of the shared resource falls below the maximum utilization.

Thus, the present invention provides for the notification of a user of a shared resource when the shared resource is predicted to be over-utilized. The user may then reduce the utilization of the shared resource to avoid the problems associated with over-utilization.

In another embodiment of the present invention, the duration between the present utilization of the shared resource and a maximum utilization of the shared resource is predicted at predefined intervals. Users of the shared resource are notified of a potential shortage of the shared resource if the prediction of the predicted duration between the present utilization and the maximum utilization is within the predefined interval.

The prediction of the duration between the current usage and the maximum usage may be accomplished by determining the change in utilization of the shared resource over the predefined interval to provide a utilization differential rate. The current utilization value for the shared resource is also determined. The difference between the current utilization and the maximum utilization is also determined to provide a utilization differential. The utilization differential may then be divided by the utilization differential rate to determine the duration to the maximum utilization at the utilization differential rate. Users of the shared resource may then be notified of a potential shortage of the shared resource if division results in a value of less than the predefined interval.

The present invention is particularly well suited to avoid over-utilization of buffers in a data processing system with a communications protocol stack. In such a case, the notification of users of the storage of potential over-utilization of the communications buffers may avoid such over-utilization. Thus, the inefficiency resulting from discarding data or the use of other techniques such as back pressure to slow the applications using the resource may be reduced through the utilization of the present invention.

As will further be appreciated by those of skill in the art, the present invention may be embodied as a method, apparatus/system or computer program product.

DETAILED DESCRIPTION OF THE INVENTION

Figure 1:
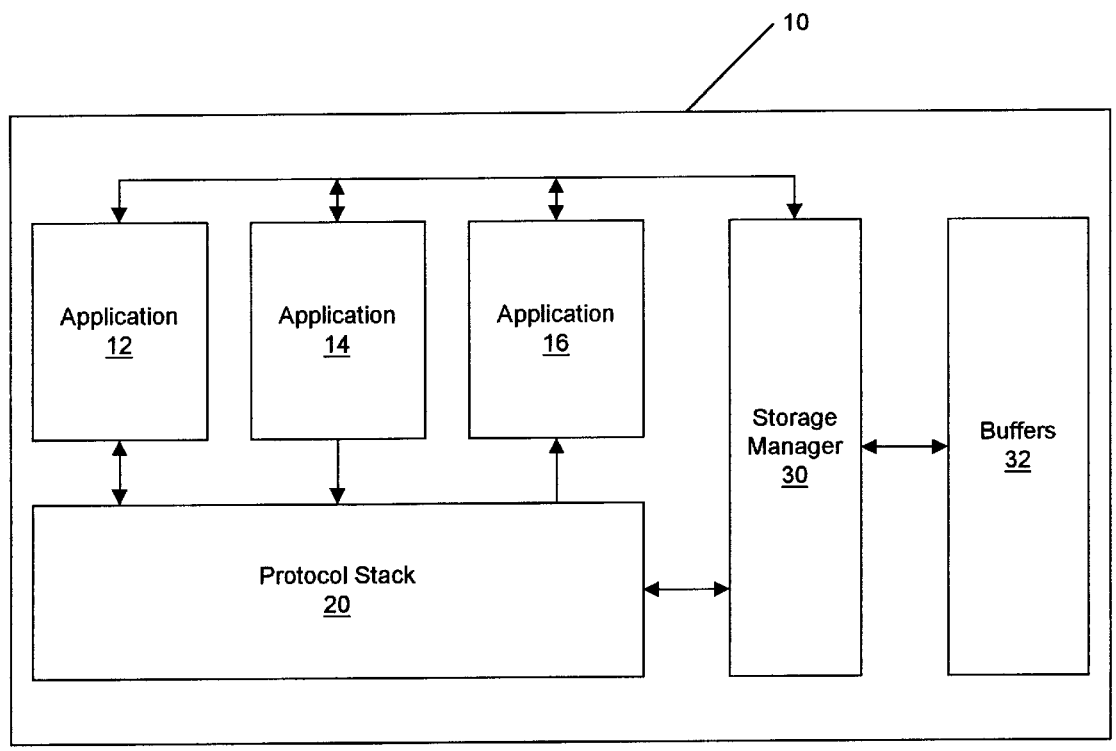
FIG. 1 is a block diagram of a data processing having a shared resource.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The principles and teachings of the present invention may be utilized in any number of shared resource situations. On such shared resource environment which may be utilized to illustrate the use of the present invention is a memory management system such as is described in commonly assigned United States Patent Application entitled METHODS AND SYSTEMS FOR CONTROL OF MEMORY, application Ser. No. 08/802,599, the disclosure of which is incorporated by reference herein as if set forth fully.

In the memory management example, the present invention may be utilized to determine if a fixed storage constraint exists. In a common memory, which is utilized by multiple applications, it is known that a storage manager may control the paging of memory so as to properly allocate the shared memory resource. In such an instance, the storage manager may utilize the present invention to control the allocation of memory to fixed (i.e. non-pageable) pages. Thus, for example, when a storage manager requests a memory allocation in response to a request for memory by an application program the storage manager determines whether too many pages have been set to the fixed state and, thus, not enough pages can be replaced or discarded from memory.

Rather than utilizing a fixed threshold, the storage manager may predict the utilization of the memory based on the historical utilization to manage the resource. Accordingly, the fixed page level for memory could be determined for a first interval and the differential in fixed page level from the beginning of the interval to the end of the interval utilized to predict the utilization at the end of a subsequent interval. If the predicted utilization exceeds the established critical threshold, which may be set to 100% utilization, then the fixed constraint flag may be set.

The present invention will now be described in more particularity with reference to the figures which illustrate the use of the present invention in a storage manager situation. FIG. 1 illustrates one embodiment of the present invention in a data processing system which utilizes a storage manager such as that described above. While the present invention is described herein with respect to the control of buffers in a data processing system, as will be appreciated by those of skill in the art, the principles of the present invention apply to any shared resource which may be over-utilized. For example, the present invention may be utilized in the control of other memory accesses or other shared resources of a data processing system. Accordingly, the present invention should not be construed as limited to the data processing system example provided herein.

As seen in FIG. 1, a data processing system 10 has multiple concurrent applications 12, 14 and 16 executing on the processing system. These concurrent applications may take many forms known to those of skill in the art. Furthermore, these applications may be associated with a single user or multiple users of the data processing system 10. However, each of the applications 12, 14 and 16 may generate data to be transmitted to or receive data from the protocol stack 20. Thus, each of the applications 12, 14 and 16 may be considered a user of the protocol stack 20. As used herein the term "user" refers to any software programs which utilizes a shared resource, including applications, procedures, operating systems, applets, device drivers, protocol layers or other software components known to those of skill in the art.

The data processing system 10 also has a storage manager 30 which provides access to the buffers 32 to the applications 12, 14 and 16 and the protocol stack 20. As is illustrated in FIG. 1, the communications between the protocol stack 20 and the applications 12, 14 and 16 may be bi-directional (application 12), transmit only (application 14) or receive only (application 16).

The storage manager 30 provides access to data storage devices such as registers, random access memory or the like which provide buffers 32 in which to store data. Because the set of buffers 32 managed by the storage manager 30 is finite in size, if too many buffers are used, it may be possible to not have an available buffer in which to store the data. However, according to the present invention, the storage manager 30 monitors its buffer utilization over time to avoid over-utilization of the buffers 32. Over-utilization is used herein to refer to an undesirably high level of utilization of a shared resource. In the case of the buffers 32, this undesirably high level of utilization occurs when data cannot be properly stored because no buffers are available to store the data.

Figure 2:
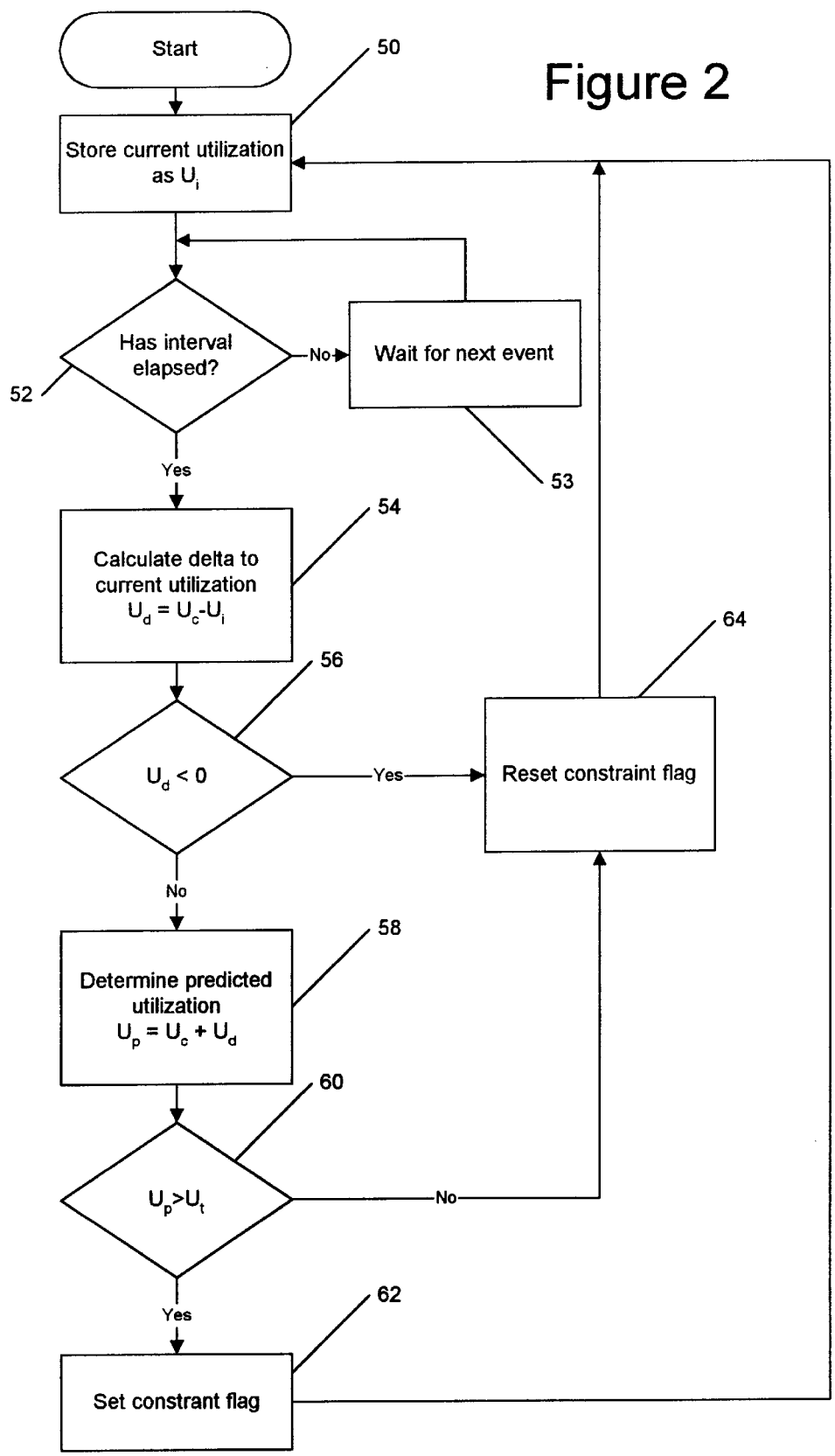
FIG. 2 is a flow chart illustration of operations of a predictive constraint avoidance system according to the present invention.

Operation of the present invention will now be described with respect to FIG. 2. As seen in FIG. 2, the storage manager 30 stores the current utilization of the shared resource (buffers) 32 (block 50). The storage manager 30 makes a determination that a predetermined number of events, which may correspond to a predetermined time period or may correspond to a predetermined number of utilization events, such as allocation requests has occurred (block 52). If the predetermined number events has not elapsed, then the determination is again made after occurrence of the next event (block 52 and block 53). The storage manager 30 may take into account that usage of the buffers 32 may vary with time. Furthermore, by using a utilization event count a varied time interval may be obtained. Thus, use of a utilization event count allows for the dynamic optimization of the frequency of resource checks in response to the instantaneous usage pattern. The use of a utilization event count rather than a time interval also may eliminate the need for timers. A utilization event may generally be described as an event which causes a change in the utilization of the shared resource or a related resource. A related resource to the shared resource is a resource which may have an impact on the utilization or allowable utilization of the shared resource. Actions which may constitute a utilization event in the present example include allocates, frees, expansions and contractions of the buffers 32.

After either the predetermined time or the predetermined number of utilization events has occurred, the storage manager 30 calculates the differential between the usage level prior to waiting and the usage level after waiting the predetermined period (block 54). This differential, as illustrated, may be calculated by $U_d = U_c - U_I$ where $U_d$ is the differential utilization, $U_c$ is the current utilization and $U_I$ is the initial utilization stored in block 50.

After determining the differential utilization, the storage manager 30 tests to see if the differential is negative (block 56). If the differential is negative, the utilization of the shared resource is decreasing and, therefore, a potential shortage of the shared resource is not expected during the next predetermined period. If multiple event intervals or a filtered approach is used, then a decrease in the last event interval does not necessarily mean that the shared resource use is declining over the multiple event intervals used in the utilization prediction. Accordingly, as will be appreciated by those of skill in the art, other measures of predicted utilization may be used based on the type of prediction employed. As used herein, the phrase potential shortage refers to a possible over-utilization condition of a shared resource. An over-utilization condition is a level of utilization of the shared resource which, for a particular resource, is to be avoided. Thus, for example, a complete exhaustion of available buffers may be considered an over-utilization condition and, therefore, prediction of a complete exhaustion may be considered a prediction of a potential shortage. However, if, for a particular system, less than complete exhaustion or even more than complete exhaustion of the shared resource are considered the thresholds for over-utilization, then potential shortages may be predicted based on these thresholds.

Returning to FIG. 2, because a potential shortage does not exist, the storage manager 30 resets a constraint flag (block 64) which indicates that the applications 12, 14 and 16 and the protocol stack 20 may fully utilize the buffers 32. The constraint flag may be a bit in a status register or in a status message which is provided to the protocol stack or applications. As will be appreciated by those of skill in the art, any number of known techniques may be utilized to notify a user of buffers 32 that unconstrained operation may be continued.

If, however, the utilization differential is not negative, then the storage manager 30 determines the predicted utilization $U_p$. The predicted utilization in the illustrated embodiment is determined as $U_p=U_c+U_d$ (block 58). Calculation of $U_p$ may be through multiple event intervals as discussed elsewhere herein. If the predicted utilization is greater than a predetermined threshold value $U_t$ (block 60), then the storage manager 30 sets the constraint flag (block 62) to indicate to the protocol stack 20 and/or applications that constrained use could potentially exhaust the available buffers 32, i.e. a potential shortage exists. The protocol stack 20 and applications 12, 14 and 16 may then take appropriate action to reduce the usage of buffers and/or data flow rate to avoid the exhaustion of the buffers 32. Otherwise, operations flow from block 60 to block 64 to reset the constraint flag.

In addition to the setting of a constraint flag which indicates a potential over-utilization, a critical flag may also be set by storage manager 30. The critical flag may be set when the current utilization $U_c$ exceeds the predefined threshold $U_t$. The utilization may be checked on every allocate or free to provide between interval setting of the critical flag, thus providing immediate response. Like the constraint flag, the critical flag may also be provided to the protocol stack 20 and/or applications in a manner similar to that of the constraint flag. The critical flag may be set, for example, if the protocol stack 20 does not take action quickly enough to avoid buffer over-utilization. In such a case, the critical flag may be reset when the buffer utilization falls below the critical level or the differential utilization is negative. The critical flag may indicate to the protocol stack 20 that storage allocation requests cannot be accepted by the storage manager 30 and that these requests to the storage manager 30 should be discontinued until the critical flag has been reset.

The storage manager 30 repeats the above procedure as long as the shared resource is being utilized by a user. By predictively setting the constraint flag, the threshold value may be set to the highest allowed buffer utilization. Such a high threshold may be established because the constraint flag is generally set before the threshold is actually reached based on the predicted future utilization of the buffers 32. Accordingly, an adaptive, dynamic feed-forward feedback system is provided to avoid over-utilization of shared resources. Thus, the adverse impact of over-utilization or exhaustion may be avoided without establishing an arbitrarily low threshold which may itself adversely impact performance.

Figure 3:
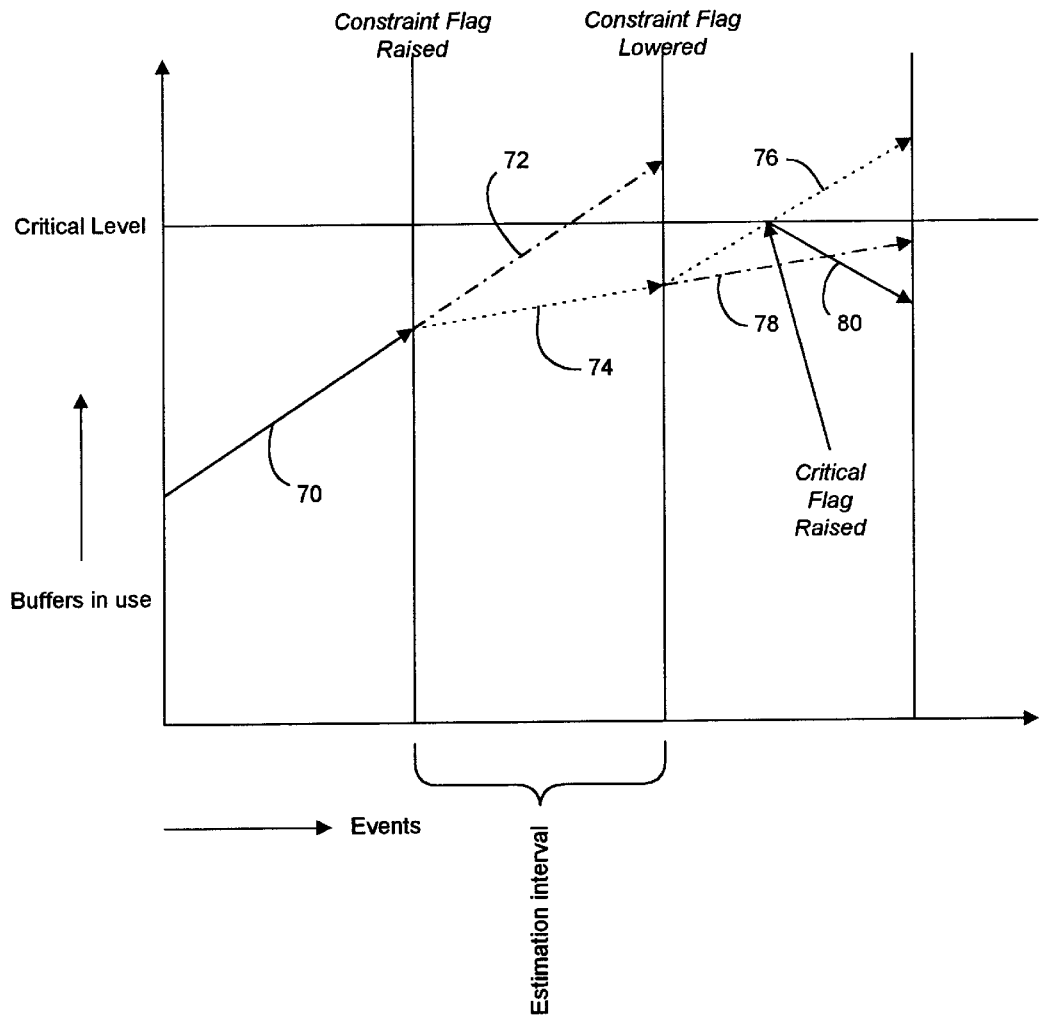
FIG. 3 is a graph illustrating the operation of the present invention.

FIG. 3 is a graph illustrating the operation of the present invention. As seen in FIG. 3, line 70 indicates the change in utilization of buffers 32 for a first interval (either time or number of events). The dashed line 72 extending from line 70 illustrates the predicted change in utilization of buffers 32 based upon the rate of utilization reflected in line 70. As can be seen in FIG. 3, based on the predicted increase in buffer utilization, the critical level of buffers is predicted to exceed in the second interval. Thus, the constraint flag is set and the protocol stack 20 and applications 12, 14 and 16 reduce the buffer allocation requests to the storage manager 30 and/or free buffers held. The reduced usage of buffers 32 is reflected in line 74 which is the actual change in utilization of buffers 32 for the second interval.

Based on the utilization of buffers 32 from the second interval the predicted change in utilization for the third interval is illustrated by line 78. Because the predicted use of buffers 32 is less than the critical level, the constraint flag is reset. However, the actual utilization of buffers 32 in the third interval is greater than expected as is illustrated by line 76 and the critical level is reached. The critical flag is then set by the storage manager 30 and the protocol stack 20 and applications 12, 14, and 16 stop allocation requests to the storage manager 30 and/or free buffers held, thus causing the actual buffer utilization, as reflected in line 80, to fall, thereby, avoiding over-utilization.

While the present invention has been described with respect to a determination of whether the total capacity of buffers 32 will be utilized within the next interval, as will be appreciated by those of skill in the art, the benefits of the present invention may also be obtained by predicting when in the future the threshold would be expected to be exceeded. The predicted time may then be compared to the duration of the next interval to determine if the constraint flag should be set.

Furthermore, the present invention has been described with respect to the utilization of the previous interval and a linear extrapolation from that interval. However, as will be appreciated by those of skill in the art, data from more than one interval may be utilized to determine the utilization trend. Furthermore, more complex predictive models may be utilized, including models utilizing multiple historical intervals. For example, an integral function could be utilized to dampen variations in utilization. Furthermore, a proportional prediction could be utilized based on the proximity of the current utilization to the threshold. Also, the duration of intervals could be modified based on the proximity of the current utilization to the threshold utilization.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling access to a shared data processing resource in a data processing system, the method comprising the steps of:

predicting future utilization of the shared data processing resource based upon a rate of change of utilization of the shared data processing resource determined from historical utilization of the shared data processing resource over a predefined number of events or predetermined time intervals; and notifying users of the shared data processing resource of a potential future shortage of the shared data processing resource by setting a critical flag if the current utilization of the shared resource reaches a predefined maximum utilization value, and by setting a constraint flag if said step of predicting predicts that the utilization of shared data processing resource will be greater than the predefined maximum utilization value of the shared resource.

2. A method according to claim 1, wherein said step of predicting utilizes linear extrapolation based upon the rate of change of utilization of the shared resource to predict a future utilization of the shared resource.

3. A method according to claim 1, wherein said step of predicting utilizes a filtered extrapolation based upon the rate of change of utilization of the shared resource to predict a future utilization of the shared resource.

4. A method according to claim 1, wherein said step of predicting utilization of the shared resource comprises the steps of:

determining a change in utilization of the shared resource over a predefined number of events;

determining a current utilization value for the shared resource; and predicting a future utilization based upon the change in utilization and the current utilization.

5. A method according to claim 4, wherein said step of predicting a future utilization of the shared resource comprises the step of adding to the current utilization value the change in utilization of the shared resource so as to provide a prediction of the utilization of the shared resource after a subsequent predefined number of events.

6. A method according to claim 4, wherein said step of predicting a future utilization of the shared resource comprises the steps of:

dividing the change in utilization by the predefined number of events to provide an incremental change value;

multiplying the incremental change value by the predefined number of events into the future of the future utilization to provide a future differential value; and summing the future differential value and the current utilization to predict the future utilization.

7. A method according to claim 4, wherein the predefined number of events comprises a predefined period of time.

8. A method according to claim 4, wherein the predefined number of events comprises a predefined number of utilization events.

9. A method according to claim 5, wherein said step of notifying users of the shared resource, comprises notifying users of a shortage of the shared resource if said step of adding to the current utilization results in the prediction of the utilization of the shared resource exceeding the predefined maximum utilization of the shared resource.

10. A method according to claim 1, further comprising the steps of:

maintaining the constraint flag as set until the occurrence of at least one of a slope of the change of utilization of the shared resource becomes negative and the prediction of the utilization of the shared resource predicts that the shared resource will no longer be greater than the predefined maximum utilization value of the shared resource.

11. A method according to claim 10, further comprising the steps of:

resetting the critical flag when the current utilization of the shared resource falls below the predefined maximum of the shared resource utilization.

12. A method according to claim 1, wherein said step of predicting utilization of the shared resource comprises the step of predicting, at a predefined interval, a stretch between a current utilization of the shared resource and the predefined maximum utilization of the shared resource, and, wherein said step of notifying comprises the step of notifying users of the shared resource of a potential future shortage of the shared resource if said step of predicting predicts that the stretch is within the predefined interval.

13. A method according to claim 12, wherein said step of predicting, at a predefined interval, a duration, comprises the steps of:

determining a change in utilization of the shared resource over the predefined interval to provide a utilization differential rate;

determining the current utilization of the shared resource;

determining the difference between the current utilization and the predefined maximum utilization to provide a utilization differential value; and dividing the utilization differential value by the utilization differential rate.

14. A method according to claim 13, wherein said step of notifying comprises the step of notifying users of the shared resource of a potential future shortage of the shared resource if said step of dividing results is a value of less than the predefined interval.

15. A method according to claim 14, wherein the predefined interval is a predefined time period.

16. A method according to claim 14, wherein the predefined interval is a predefined number of utilization events.

17. A method according to claim 16, wherein the events are selected from the group comprising buffer allocates, frees, expansions and contractions.

18. A method according to claim 14, wherein the predefined interval is defined by a combination of a predefined number of events and a predefined time interval.

19. A system for controlling access to a shared data processing resource in a data processing system, comprising:

means for predicting future utilization of the shared data processing resource based upon a rate of change of utilization of the shared data processing resource determined from historical utilization of the shared data processing resource over a predefined number of events or predetermined time intervals; and means for notifying users of the shared data processing resource of a potential future shortage of the shared data processing resource by setting a critical flag if the current utilization of the shared resource reaches a predefined maximum utilization value, and by setting a constraint flag if said means for predicting predicts that the utilization of shared data processing resource will be greater than the predefined maximum utilization value of the shared resource.

20. A system according to claim 19, wherein said means for predicting utilization of the shared resource comprises:

means for determining a change in utilization of the shared resource over a predefined number of events;

means for determining a current utilization value for the shared resource; and means for predicting a future utilization of the shared resource based upon the change in utilization and the current utilization.

21. A system according to claim 20, wherein said means for predicting a future utilization of the shared resource comprises means for adding to the current utilization value the change in utilization of the shared resource so as to provide a prediction of the utilization of the shared resource after a subsequent predefined number of events.

22. A system according to claim 20, wherein said means for predicting a future utilization of the shared resource comprises:

means for dividing the change in utilization by the predefined number of events to provide an incremental change value;

means for multiplying the incremental change value by the predefined number of events into the future of the future utilization to provide a future differential value; and means for summing the future differential value and the current utilization to predict the future utilization.

23. A system according to claim 20, wherein the predefined number of events comprises a predefined number of utilization events.

24. A system according to claim 19, wherein said means for predicting utilization of the shared resource comprises means for predicting, at a predefined interval, a stretch between a current utilization of the shared resource and the predefined maximum utilization of the shared resource, and, wherein said means for notifying comprises means for notifying users of the shared resource of a potential future shortage of the shared resource if said means for predicting predicts that the stretch is within the predefined interval.

25. A computer program product for controlling access to a shared data processing resource in a data processing system, comprising:

a computer-readable storage medium having computer-readable program code means embodied in said medium, said computer-readable program code means comprising:

computer-readable program code means for predicting future utilization of the shared data processing resource based upon a rate of change of utilization of the shared data processing resource determined from historical utilization of the shared data processing resource over a predefined number of events or predetermined time intervals; and computer-readable program code means for notifying users of the shared data processing resource of a potential future shortage of the shared data processing resource by setting a critical flag if the current utilization of the shared resource reaches a predefined maximum utilization value, and by setting a constraint flag if said computer-readable program code means for predicting predicts that the utilization of shared data processing resource will be greater than the predefined maximum utilization value of the shared resource.

26. A computer program product according to claim 25, wherein said computer-readable program code means for predicting utilization of the shared resource comprises:

computer-readable program code means for determining a change in utilization of the shared resource over a predefined number of events;

computer-readable program code means for determining a current utilization value for the shared resource; and computer-readable program code means for predicting a future utilization based upon the change in utilization and the current utilization.

27. A computer program product according to claim 26, wherein said computer-readable program code means for predicting a future utilization of the shared resource comprises computer-readable program code means for adding to the current utilization value to the change in utilization of the shared resource so as provide a prediction of the utilization of the shared resource after a subsequent predefined number of events.

28. A computer program product according to claim 26, wherein said computer-readable program code means for predicting a future utilization of the shared resource comprises:

computer-readable program code means for dividing the change in utilization by the predefined number of events to provide an incremental change value;

computer-readable program code means for multiplying the incremental change value by the predefined number of events into the future of the future utilization to provide a future differential value; and computer-readable program code means for summing the future differential value and the current utilization to predict the future utilization.

29. A computer program product according to claim 26, wherein the predefined number of events comprises a predefined number of utilization events.

30. A computer program product according to claim 25, wherein said computer-readable program code means for predicting utilization of the shared resource comprises computer-readable program code means for predicting, at a predefined interval, a stretch between a current utilization of the shared resource and the predefined maximum utilization of the shared resource, and, wherein said computer-readable program code means for notifying comprises computer-readable program code means for notifying users of the shared resource of a potential future shortage of the shared resource if said computer-readable program code means for predicting predicts that the stretch is within the predefined interval.

* * * * *

UNITED STATES PATENT AND TRADEMARK OFFICE
CERTIFICATE OF CORRECTION

PATENT NO. : 6,016,503
DATED : January 18, 2000
INVENTOR(S) : Overby, Jr. et al.

It is certified that error appears in the above-identified patent and that said Letters Patent is hereby corrected as shown below:

Column 9,
Line 63, please delete "of the shared resource utilization" and substitute -- utilization of the shared resource -- therefor.

Column 10,
Line 7, please delete "duration" and substitute -- stretch -- therefor.

Column 12,
Line 13, please delete "to".
Line 14, after "so as" please insert -- to --.

Signed and Sealed this

Thirtieth Day of July, 2002

Attest:

Attesting Officer

JAMES E. ROGAN
Director of the United States Patent and Trademark Office